United States Patent
Rajan

(10) Patent No.: US 7,787,875 B2
(45) Date of Patent: Aug. 31, 2010

(54) MODULATION OF A CARRIER RADIO SIGNAL BY A MOBILE TERMINAL IN A WIRELESS TELECOMMUNICATIONS NETWORK

(75) Inventor: Govinda Nallappa Rajan, Huizen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 980 days.

(21) Appl. No.: 11/454,081

(22) Filed: Jun. 15, 2006

(65) Prior Publication Data

US 2007/0293219 A1    Dec. 20, 2007

(51) Int. Cl.
*H04W 4/00*    (2009.01)

(52) U.S. Cl. .................... 455/422.1; 370/328

(58) Field of Classification Search .................. None
See application file for complete search history.

(56) References Cited

U.S. PATENT DOCUMENTS

| | | | |
|---|---|---|---|
| 5,870,392 A * | 2/1999 | Ann .......................... | 370/335 |
| 2002/0114307 A1* | 8/2002 | Apneseth et al. ............ | 370/342 |
| 2006/0111100 A1* | 5/2006 | Murata et al. ............... | 455/423 |
| 2007/0218920 A1* | 9/2007 | Bolin ........................ | 455/456.1 |

* cited by examiner

*Primary Examiner*—Erika A Gary

(57) ABSTRACT

A method is provided of transmitting information from a mobile terminal in a wireless telecommunications network. The method involves sending a radio signal from a first base station to a second base station. The mobile terminal modulates the radio signal so as to include the information into the radio signal. The second base station receives the radio signal and decodes the information.

11 Claims, 4 Drawing Sheets

MODULATION OF A CARRIER RADIO SIGNAL BY A MOBILE TERMINAL IN A WIRELESS TELECOMMUNICATIONS NETWORK

FIELD OF THE INVENTION

The present invention relates to telecommunications, in particular to wireless telecommunications.

DESCRIPTION OF THE RELATED ART

In known wireless telecommunications networks, the shift towards higher data rates causes mobile terminals to require relatively more radio frequency (RF) transmission power. Higher transmission power enables greater accuracy of reception, thereby permitting higher data rates.

A mobile terminal gets connected to a wireless telecommunications network when the mobile terminal is within range of an antenna of a base station of the network. To ensure good uplink connectivity, i.e. good coverage in the direction of transmissions from the mobile terminal to the base station, either the transmission power of the RF transmitter in the mobile terminal has to be high, or a large number of base stations are required per unit area, so that the mobile terminals are practically always within range of a base station.

SUMMARY OF THE INVENTION

The inventor found a method of transmitting information that could, in many circumstances, lower the transmission power of the radio signals transmitted from mobile terminals whilst maintaining appropriately accurate reception by a base station.

An example of the present invention is a method of transmitting information from a mobile terminal in a wireless telecommunications network. The method involves sending a radio signal from a first base station to a second base station. The mobile terminal modulates the radio signal so as to include the information into the radio signal. The second base station receives the radio signal and decodes the information.

Signals can advantageously be sent from mobile terminals with lower power than otherwise, in some embodiments, yet still be accurately received. In consequence, a mobile terminal can be built with a less powerful transmitter than otherwise. As there is less demand on batteries, smaller and lighter batteries can be provided in the mobile terminals. Also, the batteries will have longer use-times between recharges.

Incidentally, the radio signal, which is transmitted directly between base stations can be used to carry data from one base station to another, for example through the network, or so as to allow multiple transmissions of the same data to a mobile terminal from different base stations.

BRIEF DESCRIPTION OF THE DRAWINGS

An embodiment of the present invention will now be described by way of example and with reference to the drawings, in which.

DETAILED DESCRIPTION

A known network will first be described for purposes of comparison. Then the example network according to the first embodiment of the invention will be described in detail.

Known Approach

Figure 1:
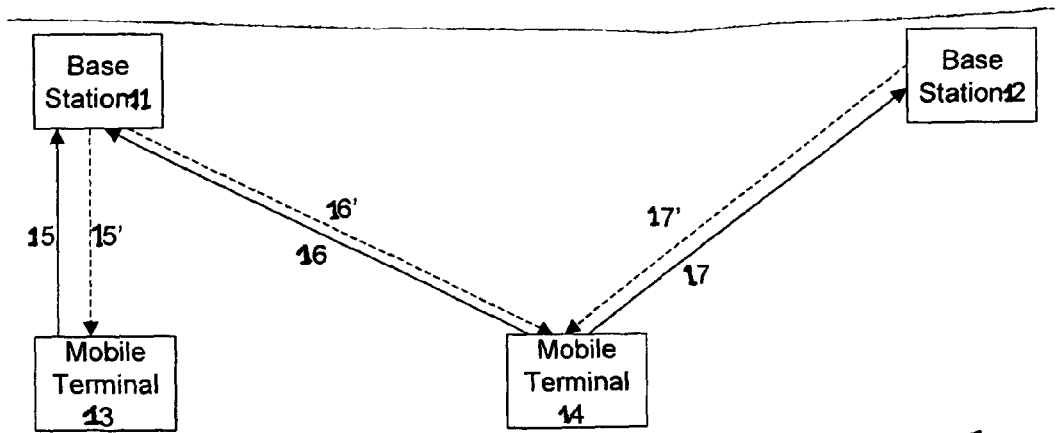
FIG. 1 is a diagram illustrating a known wireless telecommunications network (PRIOR ART)

As shown in FIG. 1, a known wireless telecommunications network, includes a first base station 11 and a second base station 12. A mobile station can be connected to a base station when radio frequency (RF) signals are received sufficiently strongly by both the mobile terminal and base station that data can be transferred in both directions. For example, as shown in FIG. 1, a mobile terminal 13 then becomes connected to the first base station 12 via an uplink transmission path 15 and a downlink transmission path 15'.

The acceptable distance between a transmitter and a receiver is limited by the strength of the transmitted signal. For example, in FIG. 1, the mobile terminal 13 is within the range of the first base station 1, as the distance of the uplink path 15 is such that the base station 11 correctly receives a signal that is transmitted from the mobile station 3. On the other hand, the distance 16,16' between a second mobile terminal 14 and the base station 11 is greater, such that a signal transmitted by the second mobile terminal 14 is not correctly received by the first base station. The distance 17,17' between the second mobile terminal 14 and its closest base station 12 is also so large that signals from the second mobile terminal 14 to that second base station 12 are also not received correctly.

A known way to have uplink connectivity between one of the base stations 11, 12 and the second mobile terminal 14 is simply to increase the transmission power of the second mobile terminal 14. However, as mobile terminals are powered by batteries, this means that the strength of the battery would need to be higher, and, assuming they are of the rechargeable type, they would need to be recharged more often There are severe practical limits to the extent that transmission signal power can be increased, for example, due to limits on battery size and the need to avoid possible ill effects on user's health.

Another known way to ensure connectivity is to increase the density of base stations, i.e. the number per unit area. Unfortunately, this would require more investment in base stations, and base station use would be less efficient as the ratio of terminals to base stations would be reduced.

Down-stream connectivity is less of a concern because the base station is supplied with mains electricity. Accordingly, increasing transmission power to ensure more accurate signal reception is straight-forward and causes less problems than it does at the mobile terminals.

Example Embodiment

When considering the known system, the inventor realised that the mobile could send its signal to a base station using less transmission power by modulating a radio signal being sent from one base station to another.

Modulating Mode

Figure 2:
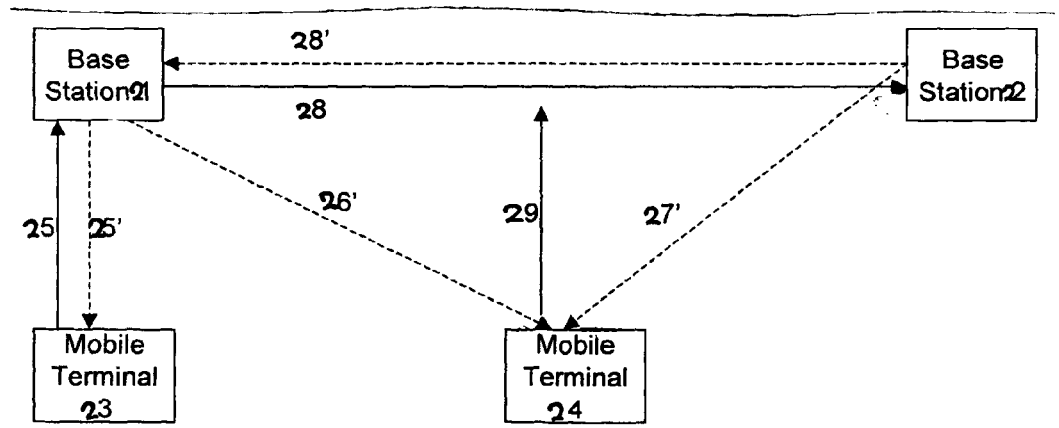
FIG. 2 is a diagram illustrating a wireless telecommunications network according to a first embodiment of the present invention.

A network according to an embodiment of the invention is shown in FIG. 2. For simplicity, only two base stations and two mobile terminals are shown. The network shown in FIG. 2 is broadly similar to that shown in FIG. 1; however, (a) a continuous radio frequency (RF) signal 28, 28' is transmitted between a first base station 21 and (b) a second base station 22 and a mobile terminal 24, instead of transmitting an RF signal directly to a base station, modulates the RF signal 28 (and/or 28') transmitted between base stations 21,22. The mobile terminal can thus be considered to be in a "modulating mode" of uplink connection.

The modulating signal 29 is relatively weak compared to the uplink signal that would otherwise be required if no carrier signal was modulated so the uplink signal was solely direct from the mobile station.

The modulating signal is based on one or more modulating signal characteristics of known type such as a frequency modulation, code modulation (e.g. as in code division multiple access systems), or time modulation. Multiple mobile terminals can modulate a single continuous RF signal 28,28', for example using different codes or different time slots. Either the mobile terminal can use pre-set signal characteristics to effect its modulation, or one or more of the base stations 21,22 can, from time to time, inform the mobile terminal of signal characteristics to be used for subsequent uplink transmissions.

In the downlink direction, a direct RF link 27' (or 26') is used from a base station 22 (or 21) to the mobile terminal 24.

It will be noted that as there are RF signals 28,28' between base stations 21,22, these signals 28, 28' can be usefully used for direct data transfer from base station to base station. One example is to transmit data across the network as an alternative to the wired network route. Another example is so as to enable the sending of the same data from two base stations to a mobile terminal, i.e. using so-called "redundant" connections, to increase accurate reliability of reception at the mobile station.

The network shown in FIG. 2 may, of course, include further base stations (not shown).

Direct Mode

For completeness, we would add that the wireless telecommunications network shown in FIG. 2 includes a further mobile terminal 23 within the range of the first base station 21, as the distance of the uplink path 25 is such that the base station 21 correctly receives a signal that is transmitted from the mobile station 23 with reasonable, rather than high, power. Accordingly, the further mobile terminal 23 is directly connected to the first base station 22 via an uplink transmission path 25 and a downlink transmission path 25'. This can be considered as a "direct mode" of uplink connection.

The network shown in FIG. 2, may, of course, include further mobile terminals (not shown).

Mobile Terminal

Each mobile terminal is configured so that either of the direct mode or the modulating mode is selectable for an uplink connection.

Figure 3:
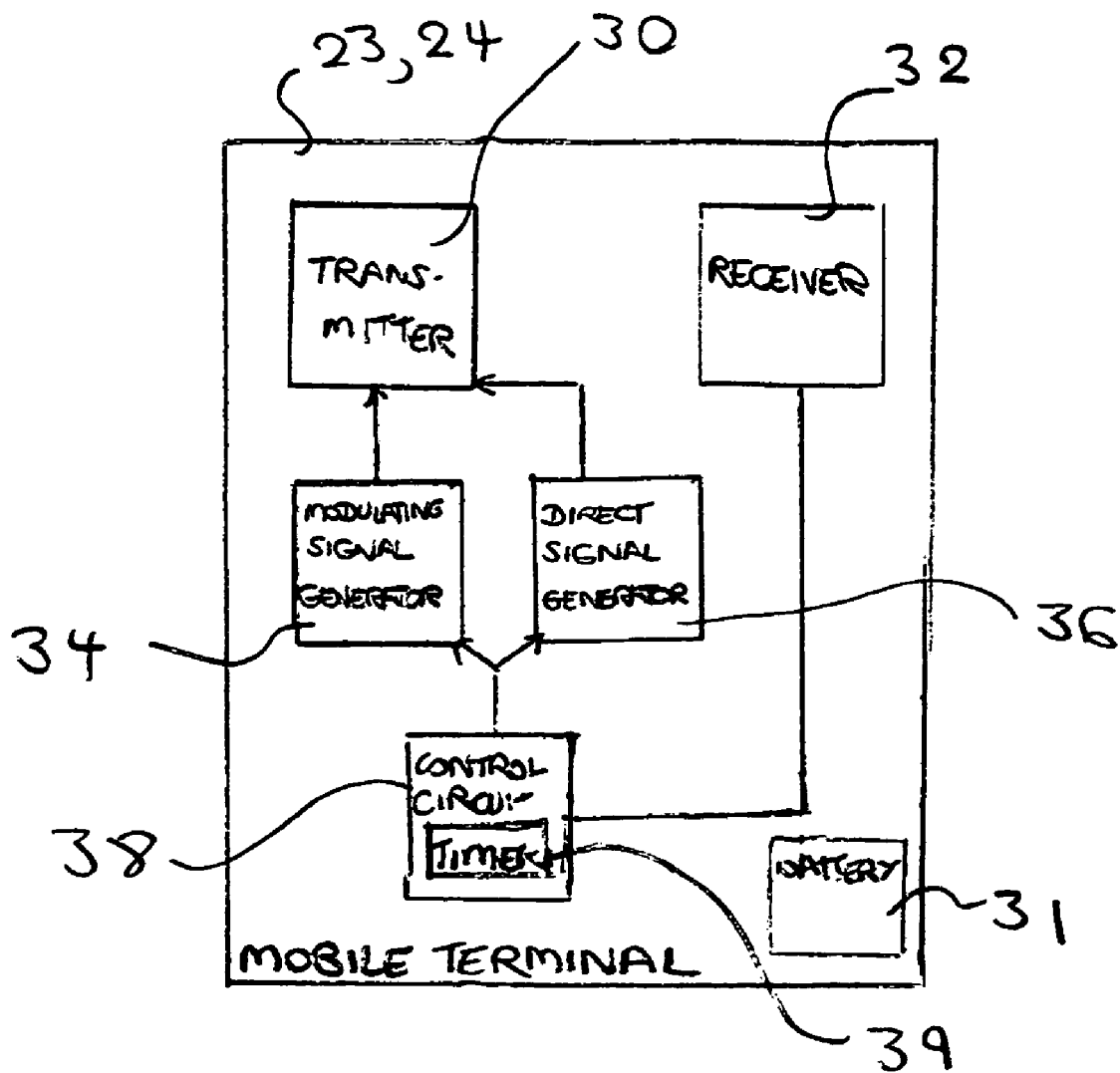
FIG. 3 is a diagram illustrating in greater detail the mobile terminal shown in FIG. 2.

As shown in FIG. 3, a mobile terminal 23, 24 includes a transmitter 30 and a receiver 32. The transmitter 30 is connected to a modulating signal generator 34 and a direct signal generator 36. The modulating signal generator 34 is operative to produce signals for transmission when the mobile terminal is in the modulating mode. The direct signal generator 36 is operative to produce signals for transmission when the mobile terminal is in the direct mode. The generators are selectable for use by a control circuit 38 connected to the two generators 34,36. The control circuit 38 is connected to the receiver 32, which receives decoded paging and handshake signals as discussed below.

The control circuit 38 includes a timer 39 for use as explained below.

Selection of Connection Mode

Figure 4:
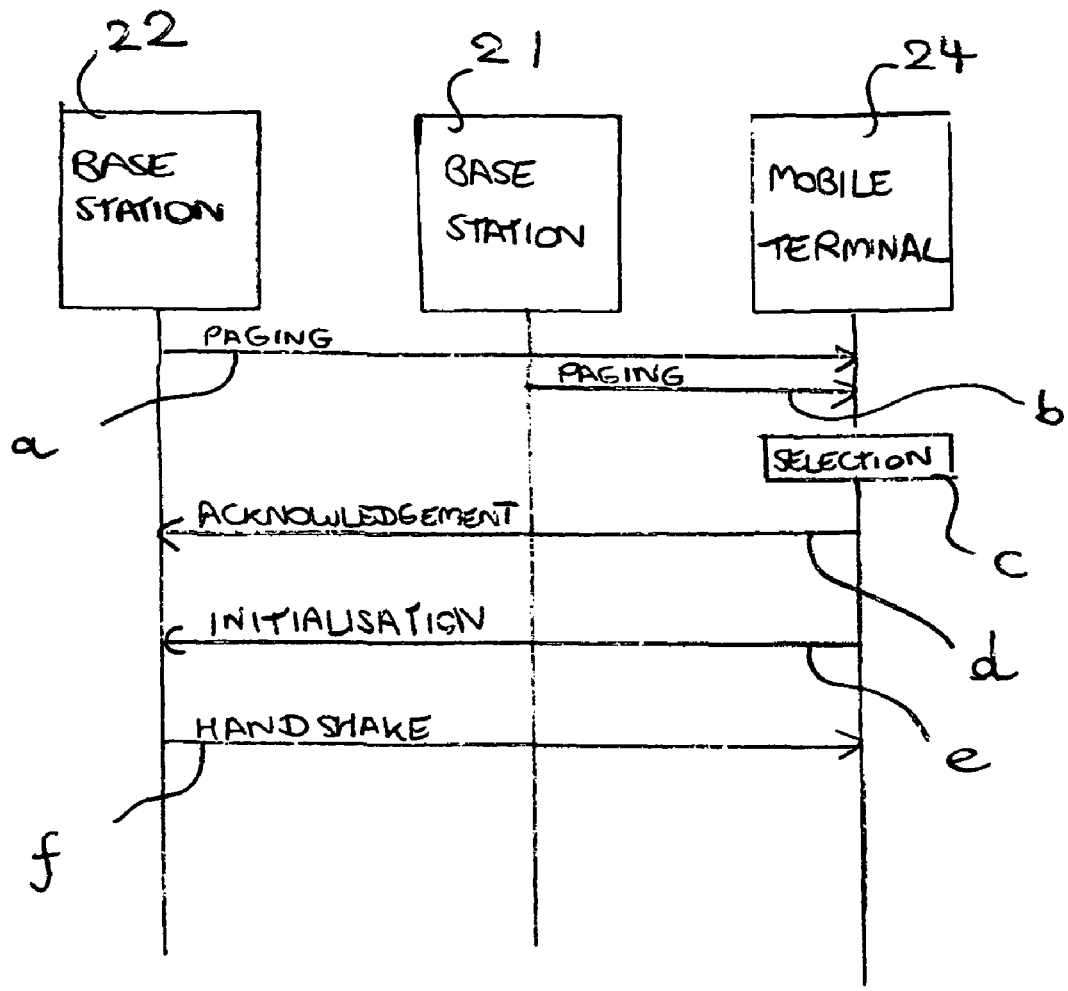
FIG. 4 is a message sequence diagram illustrating messaging in setting up a connection from the mobile terminal to a base station shown in FIG. 2.

The network is configured to have base stations 21,22 spaced sufficiently closely that any mobile terminal 23,24 within the overall coverage area of the network would likely be able to connect to a base station at any time. The base stations 21,22 each periodically transmit paging messages. As shown in FIG. 4, a mobile terminal 24 receives (FIG. 4: steps a, b) one or more paging messages, each from a different base station 22,21 around the current location of the mobile terminal 24.

The mobile terminal then selects (step c) a paging message to respond to and sends back an acknowledgement message to the selected base station. The criterion for the selection is, for example, which of the paging messages from different base stations is received most strongly. The mobile terminal then selects which mode to use for uplink connection, namely direct mode or modulating mode, then sends (step e) a corresponding initialisation message to the base station. Assuming it successfully receives the initialisation message, the base station sends (step f) a signal, often known as a handshake message, which confirms to the mobile terminal that the selected mode is acceptable for use.

Figure 5:
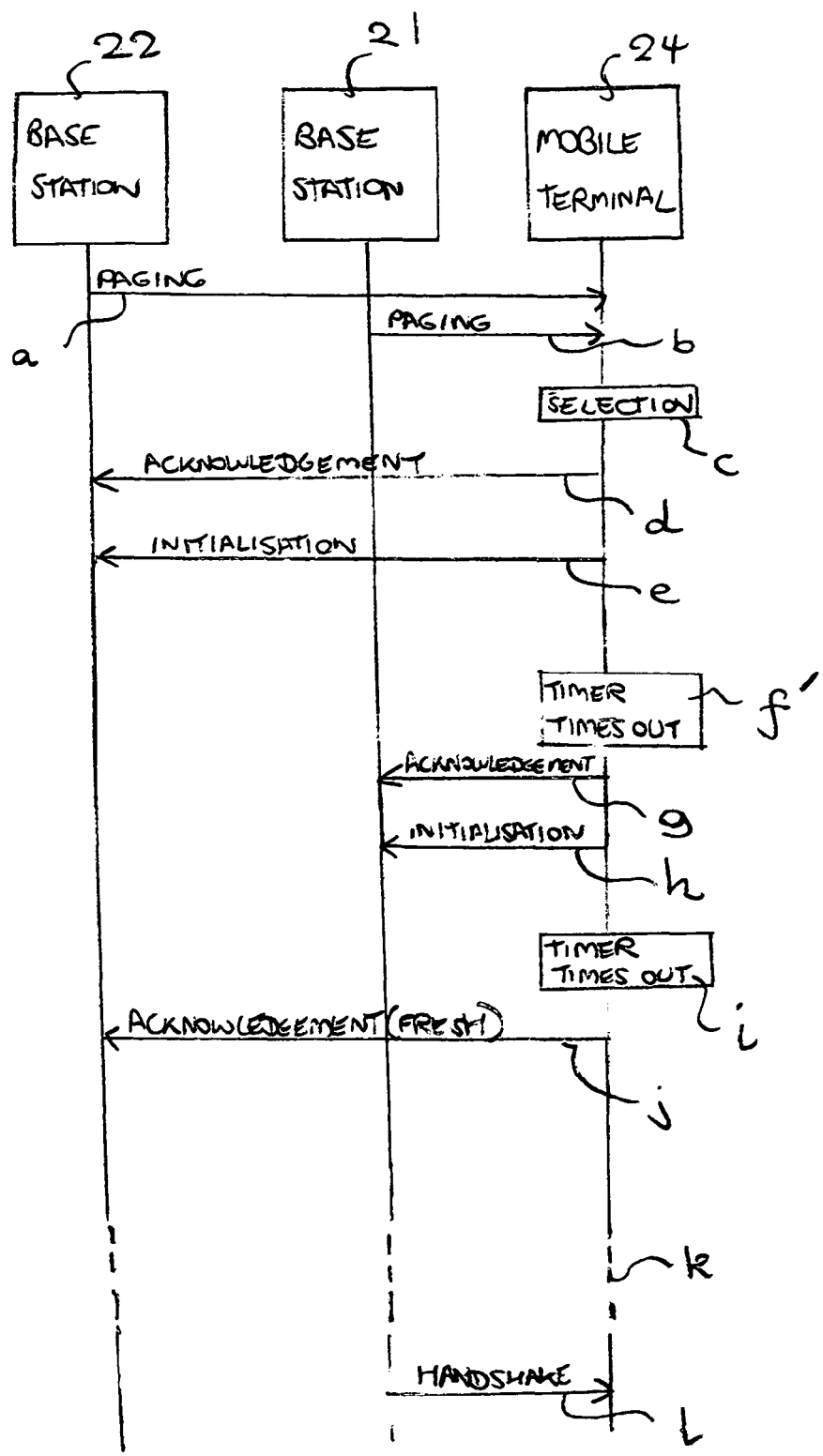
FIG. 5 is a message sequence diagram illustrating possible further messaging in setting up a connection from the mobile terminal to a base station shown in FIG. 2.

As shown in FIG. 5, on the other hand, if no handshake message is received by the mobile station from the base station within a predetermined time-out period (step f') as measured by the timer 39 of the mobile terminal, (in other words, step f as shown in FIG. 4 does not then occur), then the mobile terminal instead sends (step g) an acknowledgment signal followed by an initialisation signal (step h) to another base station. This second base station might be selected on the basis that it is the base station from which the second strongest paging message was received. If no handshake message is received from that other base station within a further time out period (step i), then the mobile terminal selects the other one of the two modes of uplink connection, namely direct mode and modulating mode, and sends (step j) a fresh acknowledgement message to the first base station.

This process continues (indicated by k in FIG. 5) with different base stations and modes being selected in a repeating sequence until the mobile terminal successfully receives (step l) a handshake message.

Signal Degradation in Modulating Mode

Referring again to FIG. 2, should there be a signal degradation, for example due to poor weather conditions attenuating radio signals, then this degradation will be detected by the base station 28 receiving the modulated signal 28 modulated by mobile terminal 24. The base station 22 then communicates with neighbouring base stations 23 to check that the other neighbouring base stations also received lower signal strength. If signal degradation is identified, the base station instructs the mobile terminal 24 to switch from modulating mode to direct mode, to ensure better reception accuracy at the base station. This is despite the disadvantage of increased radio transmission power required at the mobile terminal.

General

In some other embodiments, the mobile terminal can be uplink connected using both direct mode and modulating mode at the same time. This is so as to increase the chances of accurate reception by at least one base station of the data the mobile terminal transmits. This is sometimes known as increased "redundancy".

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of transmitting information from a mobile terminal in a wireless telecommunications network, comprising:
    sending a wireless radio signal from a first base station towards a second base station,
    the mobile terminal modulating said wireless radio signal so as to include said information into said wireless radio signal,
    then the second base station receiving over air said modulated wireless radio signal and decoding said information.

2. A method according to claim 1, in which the modulation comprises one or more of frequency modulation and time modulation.

3. A method according to claim 1, in which the network is a code division multiple access, CDMA, network, and the modulation comprises code modulation.

4. A method according to claim 1, in which the radio signal from the first base station to the second base station is also used to transmit data from the first base station to the second base station.

5. A method according to claim 1, in which the network comprises multiple base stations, each of which establishes radio links with other of the base stations, the mobile terminal:
    selecting the base station likely to receive a signal from the mobile terminal with least signal attenuation, and
    modulating the radio signal of a radio link to that base station.

6. A wireless telecommunications network comprising
    a first base station and a second base station adapted for use in communications with mobile terminals, the first base station being operative to transmit a wireless radio signal to the second base station, the network also comprising
    a mobile terminal for wireless communications comprising a transmitter and a signal generator;
    wherein the signal generator is operative to produce, from information for transmission, a modulating signal that is adapted to modulate the wireless radio signal which is passing said mobile terminal; and
    the transmitter is operative to transmit said modulating signal;
    the second base station being operative to receive over air the modulated wireless radio signal.

7. A wireless telecommunications network according to claim 6, in which the mobile terminal further comprises a further signal generator operative to control the transmitter to produce, from information for transmission, a signal to be transmitted direct to a base station without modulating the radio signal transmitted between base stations.

8. A wireless telecommunications network according to claim 7, wherein the modulating signal generator and further signal generator are selectably operative.

9. A wireless telecommunications network according to claim 8, in which the mobile terminal includes a control circuit operative to select whether to use the modulating signal generator or the further signal generator dependent on an estimate of signal attenuation to a base station.

10. A wireless telecommunications network according to claim 6, in which
    the mobile terminal comprises a further signal generator operative to control the transmitter to produce, from information for transmission, a signal to be transmitted direct to one of the base stations without modulating the radio signal between base stations; and in which
    upon a degradation in received signal quality being determined, one of the base stations instructs the mobile terminal to transfer to use of the further signal generator.

11. A wireless telecommunications network according to claim 6, in which the network comprises multiple base stations, each of which establishes radio links with others of the base stations, the mobile terminal being operative to select the base station likely to receive a signal from the mobile terminal with least signal attenuation, and modulating the radio signal of a radio link to that base station.

* * * * *